C. F. BLODGETT.
MOTOR VEHICLE DRIVING GEAR.
APPLICATION FILED JAN. 13, 1915.

1,170,399.

Patented Feb. 1, 1916.
2 SHEETS—SHEET 1.

Inventor
Charles F. Blodgett,
By Victor J. Evans
Attorney

Witnesses

C. F. BLODGETT.
MOTOR VEHICLE DRIVING GEAR.
APPLICATION FILED JAN. 13, 1915.

1,170,399.

Patented Feb. 1, 1916.
2 SHEETS—SHEET 2.

Witnesses

Inventor
Charles F. Blodgett,
By Victor J. Evans
Attorney

THE COLUMBIA PLANOGRAPH CO., WASHINGTON, D. C.

UNITED STATES PATENT OFFICE.

CHARLES F. BLODGETT, OF BUCHANAN, MICHIGAN.

MOTOR-VEHICLE DRIVING-GEAR.

1,170,399.  Specification of Letters Patent.  Patented Feb. 1, 1916.

Application filed January 13, 1915. Serial No. 2,037.

*To all whom it may concern:*

Be it known that I, CHARLES F. BLODGETT, a citizen of the United States of America, residing at Buchanan, in the county of Berrien and State of Michigan, have invented new and useful Improvements in Motor-Vehicle Driving-Gears, of which the following is a specification.

This invention relates to improvements in motor vehicle driving mechanism and has particular application to the driving axle construction.

In carrying out the present invention, it is my purpose to improve and simplify the construction of the driving mechanism between the driving shaft and the drive wheels of motor vehicles and to provide driving gear whereby the use of the usual differential gear will be eliminated and the power transmitted directly from the drive shaft to the driving axle.

It is also my purpose to provide mechanism of the class described by means of which the driving wheels of the vehicle will be driven from the engine, when the latter is coupled to the driving shaft, and which will permit the wheels to rotate relatively to one another to accommodate the differential movement thereof when the vehicle is making a turn.

A further object of my invention is to provide driving mechanism for the wheels of motor vehicles whereby the driving wheels of the vehicle may be rotated in either direction by the engine through the agency of the usual transmission gear system, and have differential movement when rotating in one direction or the other.

With the above and other objects in view, the invention consists in the construction, combination and arrangement of parts hereinafter set forth in and falling within the scope of the claim.

Figure 1:
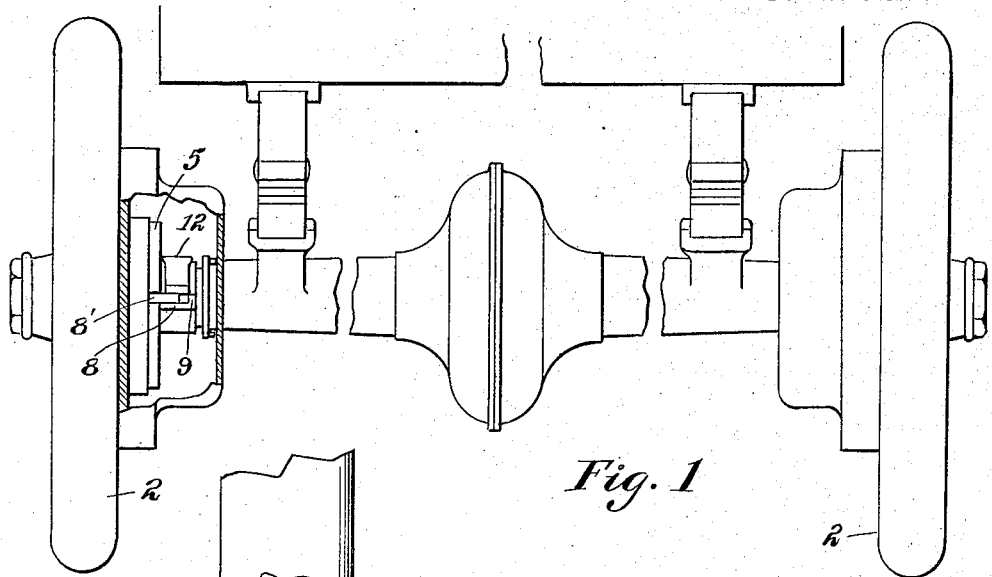
Figure 2:
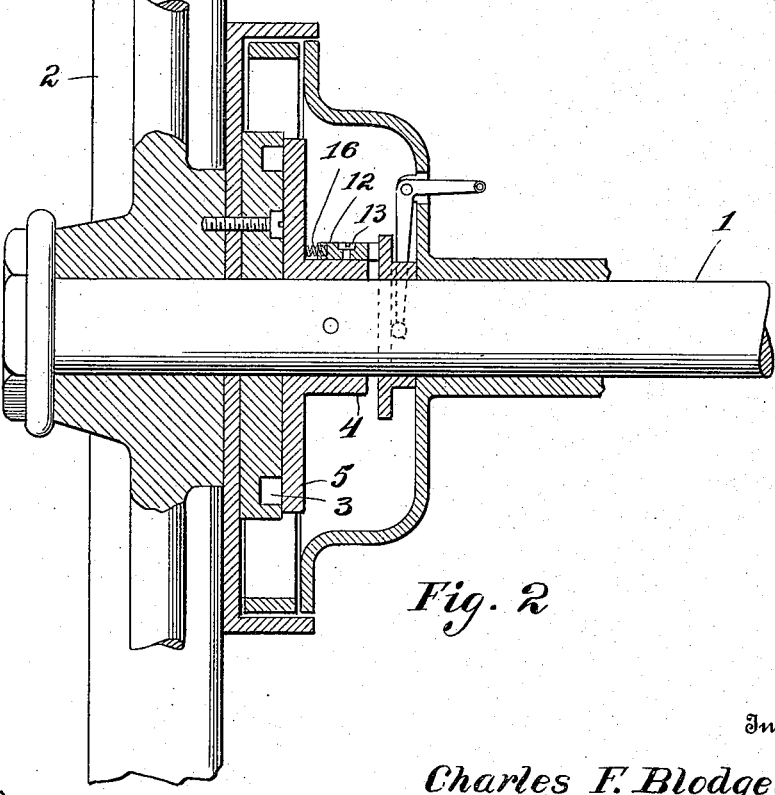
Figure 3:
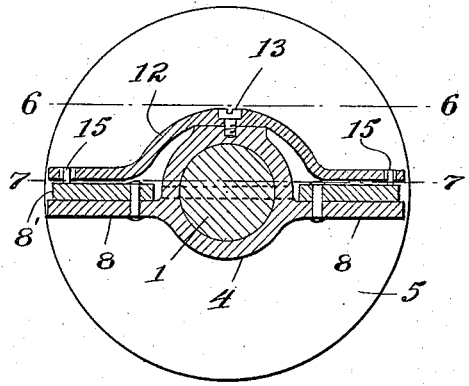
Figure 4:
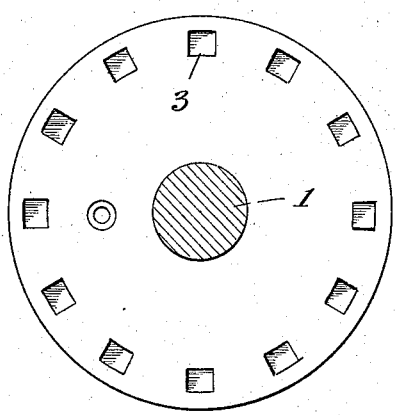
Figure 5:
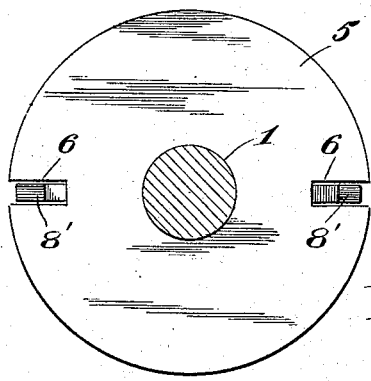
Figure 6:
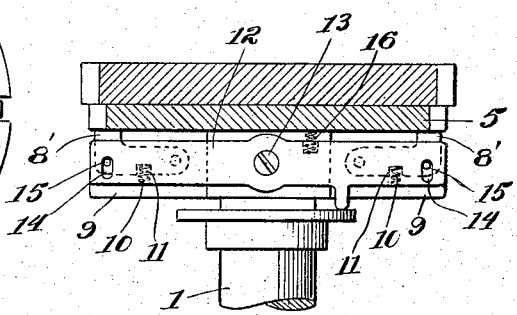
Figure 7:
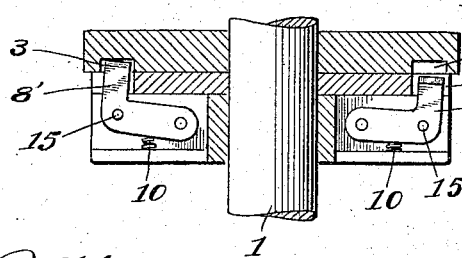

In the accompanying drawings, Figure 1 is a rear elevation of the chassis of a motor vehicle showing my improved rear axle construction. Fig. 2 is a longitudinal sectional view through the axle. Fig. 3 is a cross sectional view therethrough. Fig. 4 is a similar view showing the inner face of the hub of one of the wheels in elevation. Fig. 5 is a like view showing the face of the disk confronting the face of the hub shown in Fig. 4. Fig. 6 is a cross sectional view on the line 6—6 of Fig. 3. Fig. 7 is a similar view on the line 7—7 of Fig. 3.

Referring now to the drawings in detail, 1 designates the rear axle of a motor vehicle rotatably mounted in suitable alining bearings depending from the frame of the vehicle and secured thereto, while 2 indicates the traction wheels loosely mounted upon the respective ends of the axle 1 and capable of rotation. The driving axle 1 is connected through suitable gears with the drive shaft of the vehicle so that when the latter is driven by the engine of the vehicle motion will be imparted to the axle 1. In the present instance, the inner face of the hub of each wheel 2 is formed with an annular row of depressions 3 disposed concentrically of the axle and fixed upon the axle adjacent to the inner face of the hubs of the wheels 2 are collars 4, 4 respectively. Fast upon the outer end of each collar 4 is a disk 5 disposed concentrically of the axle and adapted to revolve therewith and placed face to face with the inner surface of the hub of the adjacent traction wheel. Formed in each disk 5 at the periphery thereof, at diametrically opposite points, are slots 6 adapted to register with the depressions 3, in the adjacent wheel hub, and fastened to each collar 4, at diametrically opposite points, and projecting outwardly therefrom, are arms 8 having the edges thereof adjacent to the disk 5 bearing against the inner surface of such disk. One side face of each arm 8 is disposed contiguous to one side wall of the adjacent slot 6 in the disk 5 and pivotally mounted upon such faces of the arms are pawl levers 8′ respectively having the pawl ends thereof arranged at right angles to the main body portions and projecting through the slot 6 and into the depressions 3 in the respective wheel hubs. The remaining side edges of the respective arms 8 are formed with right angularly projecting lugs 9 spaced apart from the inner edges of the respective pawl levers 8' and interposed between each lug 9 and adjacent pawl lever 8' is a coiled expansion spring 10 having one end thereof seated within a recess 11 in the pawl lever and the remaining end abutting the lug 9. These springs 10 act to hold the pawl ends of the pawl levers normally projected through the respective slots 6 and into the registering recesses in the row 3.

In practice, one of the pawl levers of each companion pair is normally held in inactive position, that is, the pawl end is maintained out of engagement with an adjacent recess in the wheel hub, and the pawl end of the remaining lever is permitted to engage the alining recess in the adjacent wheel hub. In order to hold one of the pawl levers normally inactive and permit the remaining lever of the companion pair to operate, any suitable means is provided. In the present instance, controlling levers 12 are pivoted between their ends as at 13 upon the respective collars 4, 4 and each lever lies parallel with the adjacent arms 8 and the outer end portions thereof overlap the outer sides of the pawl levers 8'. Formed in each controlling lever 12 adjacent to the outer extremities thereof are slots 14 and disposed within the slots 14 are pins 15, 15 secured to the outer faces of the respective pawl levers 8 and interposed between corresponding end portions of the respective controlling levers and the inner faces of the disk 5 are coiled expansion springs 16. These springs 16 act upon the controlling levers 12 in such manner that the pawl ends of corresponding pawl levers are held out of engagement with the rows of depressions 3, while the pawl ends of the remaining levers are permitted to engage the respective rows of depressions under the action of their springs 10. The pawl ends of the pawl levers of each companion pair are beveled in relatively reverse directions and when the controlling levers 12 are in normal position certain of the coöperating levers are active and the remaining coöperating levers inactive so that when power is imparted to the axle 1 motion will be transmitted through the active pawls to the hubs of the traction wheels 2, thereby rotating the latter in one direction. When the vehicle takes a curve, the outermost wheel, of necessity, revolves a greater rate than the inner wheel and owing to the pawl connection between the outer wheel and the axle, such wheel will be permitted to revolve around the axle and so permit turning of the vehicle. When it is desired to reverse the direction of movement of the driving wheels, the controlling levers 12 are swung about their pivots 13 against the action of the springs 16, thereby moving the first set of pawls out of active position and placing the remaining set of pawls in operative position so that when the axle 1 is reversed the pawls engaging in the depressions 3 will impart movement to the wheels.

In the present instance, the inner edge of each lever 12 is formed with an inwardly projecting finger 20 disposed upon the same side of the fulcrum of the lever as the spring 16. This finger 20 bears against a flange 21 formed on the collar 22 surrounding the axle 1 and capable of sliding movement thereon and under the control of a bell crank lever 23 pivoted as at 24 to the casing inclosing the controlling levers, dogs, etc. When the lever 23 is swung in one direction, the collar 22 is moved toward the adjacent collar 4 and in this movement of the collar 22 the flange 21 bearing upon the finger 20 acts to swing the lever 12 against the action of the spring 16 so that the first set of pawls may be moved out of active position and the other set of pawls placed in operative position in order that the direction of rotation of the wheels may be reversed.

The ends of the pawls 8' are shown beveled in Fig. 7 of the drawings.

From the foregoing description taken in connection with the accompanying drawings, the construction, mode of operation and manner of employing my improved driving mechanism for motor vehicles will be readily apparent. It will be seen that I have provided driving gear for motor vehicles whereby the power may be imparted to the driving wheels from the engine without the necessity of employing the usual differential gear between the axle and the drive shaft.

While I have herein shown and described the preferred form of my invention by way of illustration, I wish it to be understood that I do not limit or confine myself to the precise details of construction herein described and delineated, as modification and variation may be made within the scope of the claim without departing from the spirit of the invention.

I claim:

The combination with the driving axle of a motor vehicle and wheels loosely mounted upon the respective ends of said axle and each having an annular row of depressions formed in the inner face of the hub concentrically of the axle, disks fixed to said axle concentrically thereof and face to face with the inner faces of the respective hubs, pawls carried by the respective disks and engaging the depressions in the adjacent hubs to rotate the latter from the axle in one direction and adapted to disengage the depressions to permit differential movement of the wheels, means holding said pawls normally in the depressions, a second set of pawls carried by the respective disks and adapted to engage the depressions in the adjacent hubs to rotate the latter from the axle in the reverse direction and adapted to disengage the depressions to permit differential movement of the wheels, and means for disengaging the first-mentioned pawls from the depressions and engaging the last-mentioned pawls with the depressions.

In testimony whereof I affix my signature in presence of two witnesses.

CHARLES F. BLODGETT.

Witnesses:
J. P. BEISTLE,
WILSON LEITER.

Copies of this patent may be obtained for five cents each, by addressing the "Commissioner of Patents, Washington, D. C."